United States Patent
Atanasoaei et al.

(10) Patent No.: US 11,544,914 B2
(45) Date of Patent: Jan. 3, 2023

(54) ANNOTATION OF 3D MODELS WITH SIGNS OF USE VISIBLE IN 2D IMAGES

(71) Applicant: INAIT SA, Lausanne (CH)

(72) Inventors: Constantin Cosmin Atanasoaei, Chavannes-pres-Renens (CH); Daniel Milan Lütgehetmann, Lausanne (CH); Dimitri Zaganidis, Granges (CH); John Rahmon, Lausanne (CH); Michele De Gruttola, Geneva (CH)

(73) Assignee: INAIT SA, Lausanne (CH)

( * ) Notice: Subject to any disclaimer, the term of this patent is extended or adjusted under 35 U.S.C. 154(b) by 0 days.

(21) Appl. No.: 17/190,646

(22) Filed: Mar. 3, 2021

(65) Prior Publication Data
US 2022/0262083 A1  Aug. 18, 2022

(30) Foreign Application Priority Data
Feb. 18, 2021 (GR) ................. 20210100106

(51) Int. Cl.
*G06T 19/20* (2011.01)
*G06T 7/73* (2017.01)
*G06T 7/90* (2017.01)

(52) U.S. Cl.
CPC ............... *G06T 19/20* (2013.01); *G06T 7/74* (2017.01); *G06T 7/90* (2017.01);
(Continued)

(58) Field of Classification Search
None
See application file for complete search history.

(56) References Cited

U.S. PATENT DOCUMENTS 6,246,954 B1   6/2001  Berstis et al.
6,826,301 B2  11/2004  Glickman
(Continued)

FOREIGN PATENT DOCUMENTS

CN        1658559     8/2005
CN      102376071     3/2012
(Continued)

OTHER PUBLICATIONS

Rodrigues et al., "Confidence factor and feature selection for semi-supervised multi-label classification methods," Presented at 2014 International Joint Conference on Neural Networks (IJCNN), Beijing, 2014, 864-871.
(Continued)

*Primary Examiner* — Ryan M Gray
(74) *Attorney, Agent, or Firm* — Fish & Richardson P.C.

(57) ABSTRACT

Methods, systems, and apparatus, including computer programs encoded on a computer storage medium, for annotation of 3D models with signs of use that are visible in 2D images. In one aspect, methods are performed by data processing apparatus. The methods can include projecting signs of use in a relatively larger field of view image of an instance of an object onto a 3D model of the object based on a pose of the instance in the relatively larger field of view image, and estimating a relative pose of the instance of the object in a relatively smaller field of view image based on matches between the signs of use in the relatively larger field of view image and the same signs of use in the relatively smaller field of view image.

19 Claims, 3 Drawing Sheets

(52) U.S. Cl.
CPC ............... *G06T 2207/10024* (2013.01); *G06T 2219/004* (2013.01); *G06T 2219/2021* (2013.01)

(56) References Cited

U.S. PATENT DOCUMENTS

| | | | |
|---|---|---|---|
| 6,969,809 | B2 | 11/2005 | Rainey |
| 7,889,931 | B2 | 2/2011 | Webb et al. |
| 8,515,152 | B2 | 8/2013 | Siri |
| 8,712,893 | B1 | 4/2014 | Brandmaier et al. |
| 9,262,789 | B1 | 2/2016 | Tofte |
| 9,307,234 | B1 | 4/2016 | Greiner et al. |
| 9,489,696 | B1 | 11/2016 | Tofte |
| 9,870,609 | B2 | 1/2018 | Kompalli et al. |
| 9,886,771 | B1 | 2/2018 | Chen et al. |
| 10,580,075 | B1 | 3/2020 | Brandmaier et al. |
| 10,657,707 | B1 | 5/2020 | Leise |
| 10,789,786 | B2 | 9/2020 | Zhang et al. |
| 2002/0007289 | A1 | 1/2002 | Malin et al. |
| 2004/0113783 | A1 | 6/2004 | Yagesh |
| 2004/0183673 | A1 | 9/2004 | Nageli |
| 2005/0108065 | A1 | 5/2005 | Dorfstatter |
| 2006/0103568 | A1 | 5/2006 | Powell et al. |
| 2006/0114531 | A1 | 6/2006 | Webb et al. |
| 2006/0124377 | A1 | 6/2006 | Lichtinger et al. |
| 2006/0267799 | A1 | 11/2006 | Mendelson |
| 2007/0164862 | A1 | 7/2007 | Dhanjal et al. |
| 2008/0255887 | A1 | 10/2008 | Gruter |
| 2008/0267487 | A1 | 10/2008 | Siri |
| 2008/0281658 | A1 | 11/2008 | Siessman |
| 2009/0033540 | A1 | 2/2009 | Breed et al. |
| 2009/0256736 | A1 | 10/2009 | Orr |
| 2010/0067420 | A1 | 3/2010 | Twitchell, Jr. |
| 2010/0073194 | A1 | 3/2010 | Ghazarian |
| 2010/0100319 | A1 | 4/2010 | Trinko et al. |
| 2010/0106413 | A1 | 4/2010 | Mudalige |
| 2010/0265104 | A1 | 10/2010 | Zlojutro |
| 2010/0265325 | A1 | 10/2010 | Lo et al. |
| 2010/0271196 | A1 | 10/2010 | Schmitt et al. |
| 2011/0068954 | A1 | 3/2011 | McQuade et al. |
| 2011/0102232 | A1 | 5/2011 | Orr et al. |
| 2012/0029759 | A1 | 2/2012 | Suh et al. |
| 2012/0029764 | A1 | 2/2012 | Payne et al. |
| 2012/0062395 | A1 | 3/2012 | Sonnabend et al. |
| 2014/0229207 | A1 | 8/2014 | Swamy et al. |
| 2014/0309805 | A1 | 10/2014 | Ricci |
| 2015/0287130 | A1 | 10/2015 | Vercollone et al. |
| 2015/0332512 | A1* | 11/2015 | Siddiqui ............ G06T 19/006 345/633 |
| 2016/0239922 | A1 | 8/2016 | Jimenez |
| 2017/0011294 | A1 | 1/2017 | Jagannathan |
| 2017/0293894 | A1 | 10/2017 | Taliwal |
| 2018/0005453 | A1* | 1/2018 | Siddiqui ............ G06T 15/50 |
| 2018/0040039 | A1 | 2/2018 | Wells et al. |
| 2018/0182039 | A1 | 6/2018 | Wang et al. |
| 2018/0189949 | A1 | 7/2018 | Lapiere et al. |
| 2018/0197048 | A1 | 7/2018 | Micks |
| 2018/0260793 | A1* | 9/2018 | Li ............ G06N 7/005 |
| 2018/0293552 | A1 | 10/2018 | Zhang et al. |
| 2018/0293664 | A1 | 10/2018 | Zhang et al. |
| 2018/0293806 | A1 | 10/2018 | Zhang et al. |
| 2018/0300576 | A1 | 10/2018 | Dalyac et al. |
| 2019/0213563 | A1 | 7/2019 | Zhang et al. |
| 2019/0213689 | A1 | 7/2019 | Zhang et al. |
| 2019/0213804 | A1 | 7/2019 | Zhang et al. |
| 2020/0234451 | A1* | 7/2020 | Holzer ............ G06T 7/73 |
| 2020/0236343 | A1* | 7/2020 | Holzer ............ G06T 15/10 |
| 2020/0258309 | A1* | 8/2020 | Holzer ............ G06T 7/70 |
| 2022/0137701 | A1* | 5/2022 | Bowman ............ G06F 3/165 345/156 |

FOREIGN PATENT DOCUMENTS

| | | |
|---|---|---|
| CN | 103310223 | 9/2013 |
| CN | 104268783 | 1/2015 |
| CN | 104517442 | 4/2015 |
| CN | 105488576 | 4/2016 |
| CN | 105488789 | 4/2016 |
| CN | 105678622 | 6/2016 |
| CN | 105719188 | 6/2016 |
| CN | 105956667 | 9/2016 |
| CN | 106021548 | 10/2016 |
| CN | 106022929 | 10/2016 |
| CN | 106056451 | 10/2016 |
| CN | 106127747 | 11/2016 |
| CN | 106203644 | 12/2016 |
| CN | 106250812 | 12/2016 |
| CN | 106296118 | 1/2017 |
| CN | 106296126 | 1/2017 |
| CN | 106370128 | 2/2017 |
| CN | 106372651 | 2/2017 |
| CN | 106504248 | 3/2017 |
| JP | H 0778022 | 3/1995 |
| JP | H0981739 | 3/1997 |
| JP | 2001344463 | 12/2001 |
| JP | 2002183338 | 6/2002 |
| JP | 2003132170 | 5/2003 |
| JP | 2003170817 | 6/2003 |
| JP | 2003196511 | 7/2003 |
| JP | 2003226230 | 8/2003 |
| JP | 2003346021 | 12/2003 |
| JP | 2005107722 | 4/2005 |
| JP | 2006164022 | 6/2006 |
| JP | 3839822 | 11/2006 |
| JP | 2011215973 | 10/2011 |
| JP | 5321784 | 12/2013 |
| JP | 2015184143 | 10/2015 |
| JP | 2017062776 | 3/2017 |
| JP | 2018112999 | 7/2018 |
| JP | 2018537798 | 12/2018 |
| KR | 20160018944 | 2/2016 |
| KR | 20160019514 | 2/2016 |
| KR | 20170016778 | 2/2017 |
| TW | M478859 | 5/2014 |
| WO | WO 2005109263 | 11/2005 |
| WO | WO 2013093932 | 6/2013 |
| WO | WO 2017055878 | 4/2017 |

OTHER PUBLICATIONS

Github.com [online], "Detectron2," Nov. 2020, retrieved on Mar. 5, 2021, retrieved from URL <https://github.com/facebookresearch/detectron2>, 4 pages.

Opencv.org [online], "Camera calibration and 3D reconstructions," Jul. 18, 2020,retrieved from URL <https://docs.opencv.org/4.4.0/d0/d0c/group_calin3d. html#gas549c2075fac14829ff4a58bc931c033d>, 78 pages.

Opencv.org [online], "Pose Estimation," Mar. 15, 2021, retrieved from URL <https://docs.opencv.org/master/d7/d53/tutorial_pv_pose. html>, 3 pages.

Ren et al., "Faster R-CNN: Towards real-Time Object Detection With Region Proposal Networks," IEEE Transactions on Pattern Analysis and Machine Intelligence, 2016, 1-14.

Wang, "Structural Damage Monitoring Based on Vibration Modal Analysis and Neural Network Technique," China Master's Theses Full-Text Database Information Technology, Jan. 2004, 1 page (with English abstract).

Wikipedia.org [online], "Harris Corner Detector," Jan. 21, 2021, retrieved on Mar. 5, 2021, retrieved from URL <https://en.wikipedia.org/wiki/Harris_Corner_Detector>, 6 pages.

Wikipedia.org [online], "OPTICS algorithm," Feb. 1, 2021, retrieved on Mar. 5, 2021, retrieved on URL <https://en.wikipedia.org/wiki/OPTICS_algorithm>, 5 pages.

Wikipedia.org [online], "Scale-invariant feature transform," Feb. 15, 2021, retrieved on Mar. 5, 2021, retrieved on URL <https://en.wikipedia.org/wiki/Scale-invariant_feature_transform>, 16 pages.

Wikipedia.org [online}, "DBSCAN," Feb. 13, 2021, retrieved on Mar. 5, 2021, retrieved from URL <https://en.wikipedia.org/wiki/DBSCAN>, 8 pages.

(56) References Cited

OTHER PUBLICATIONS

Yongming et al., "Research on honeycomb sandwich composite structure damage detection based on matching pursuit method," Chinese Journal of Scientific Instrument, 2012, 1 page (with English abstract).
International Search Report and Written Opinion in International Appln. No. PCT/EP2022/051811, dated Jun. 3, 2022, 16 pages.
Jayawardena, "Image based automatic vehicle damage detection," Thesis for the degree of Doctor of Philosophy, Australian National University, Nov. 2013, 199 pages, retrieved from URL<http://hdl.handle.net/1885/11072>.
Snavely et al., "Modeling the world from internet photo collections," International journal of computer vision, Nov. 2008, 80(2): 189-210.

* cited by examiner

ANNOTATION OF 3D MODELS WITH SIGNS OF USE VISIBLE IN 2D IMAGES

CROSS-REFERENCE TO RELATED APPLICATION

This application claims priority to Greek Application No. 20210100106, filed Feb. 18, 2021, the contents of which are incorporated by reference herein.

BACKGROUND

This specification relates to annotation of 3D models with signs of use that are visible in 2D images.

Many man-made objects are designed virtually in a computer with the help of 3D models. Examples include cars, airplanes, architectural structures, consumer products and their constituent components. The 3D models generally include detailed information about the size, shape, and orientation of structural features of the objects. Some 3D models also include information about other properties including e.g., composition, material properties, electrical properties, and the like. In addition to being used for design, 3D models can also be used for testing and other purposes.

Regardless of the objects being modeled and the use of the model, the models are often idealized abstractions of real-world instances of the object. For example, real-world instances of objects often have signs of use that are not captured in the models. Examples of signs of use include not only ordinary wear-and-tear that occurs over time but also damage that arises from a discrete incident. Signs of damage include deformation, scratches, and dents, e.g., on a vehicle or structure. In any case, it is rare that the signs of use of a real-world instance of an object matches a 3D model of the object—or even the signs of use of another real-world instance of the same object.

SUMMARY

This specification describes technologies relating to annotation of 3D models with signs of use. Annotation of a 3D model adds structured information to the model. In the present case, the structured information regards the signs of use. In some cases, the structured information regarding the signs of use can be used, e.g., to deform or otherwise modify a 3D model of an object so that it comports with a particular instance the object. The modified 3D model can be used in a variety of simulation and assessment processes.

The signs of use are imaged in 2D images, e.g., real images captured by a smart phone or other common imaging device. In general, a 3D model can be adequately annotated from 2D images provided that certain minimal requirements—such as sufficient resolution of the sign(s) of use and an adequate perspective on the sign(s) of use—are met by the 2D images. Further, these minimal requirements are generally intuitive to human users who are adept at discerning object features in their daily lives.

In general, one innovative aspect of the subject matter described in this specification can be embodied in methods that are performed by data processing apparatus. The methods can include projecting signs of use in a relatively larger field of view image of an instance of an object onto a 3D model of the object based on a pose of the instance in the relatively larger field of view image, and estimating a relative pose of the instance of the object in a relatively smaller field of view image based on matches between the signs of use in the relatively larger field of view image and the same signs of use in the relatively smaller field of view image.

This and other implementations can include one or more of the following features. The method can include computing hypothetical positions of signs of use in the relatively smaller field of view image using the estimated pose and the projection of signs of use onto the 3D model, comparing the hypothetical positions with actual positions of the signs of use in the relatively smaller field of view image, and identifying, based on the comparison, a subset of the signs of use that are improperly projected onto the 3D model. The 3D model can be deformed using a second subset of the signs of use that are properly projected onto the 3D model.

The method can include projecting an improperly projected of the signs of use onto the 3D model of the object based on the relative pose of the instance of the object in a relatively smaller field of view image. Projecting the improperly projected of the signs of use onto the 3D model can include identifying a region of the relatively smaller field of view image that includes a first of the improperly projected of the signs of use, matching the first of the improperly projected of the signs of use to a first of the signs of use in the relatively larger field of view image, and projecting the first of the signs of use in the relatively larger field of view image onto the 3D model of the object.

The improperly projected subset of the signs of use can be identified based on a positional deviation between the hypothetical positions and the actual positions of the signs of use in the relatively smaller field of view image. The method can include filtering the subset of the signs of use that are improperly projected onto the 3D model from the matches to establish a proper subset of the matches, and again estimating the relative pose of the instance of the object in the relatively smaller field of view image based on subset of the matches.

Projecting the signs of use in the relatively larger field of view image onto the 3D model can include determining a pose of the relatively larger field of view image. The method can include determining a dominant color of the instance of the object in the relatively smaller field of view image, identifying regions in the relatively larger field of view image, in the relatively smaller field of view image, or in both the relatively larger field of view image and the relatively smaller field of view image that deviate from the dominant color, and matching the identified regions to match the signs of use in the relatively larger field of view image and the signs of use in the relatively smaller field of view image.

The method can include determining a deviation from ideality in the instance of the object in the relatively smaller field of view image and matching the deviation in the relatively smaller field of view image to the relatively larger field of view image to match the signs of use in the relatively larger field of view image and the signs of use in the relatively smaller field of view image. The method can include estimating relative poses of the instance of the object in a plurality of relatively smaller field of view images, and computing hypothetical positions of the same signs of use in the relatively smaller field of view images using the estimated poses.

In another implementation, the subject matter described in this specification can be embodied in methods performed by data processing apparatus. The method can include annotating a 3D model of an object with signs of use from two or more 2D images of an instance of the object. Annotating the 3D model can include receiving the 3D model and the 2D images, wherein a first of the 2D images is a relatively larger field of view image of the instance and a second of the 2D images is a relatively smaller field of view image of the instance, matching signs of use that are visible in the relatively larger field of view and relatively smaller field of view images, projecting the signs of use in the relatively larger field of view image onto the 3D model of the object, estimating a pose of the instance in the relatively smaller field of view image using the projection of signs of use onto the 3D model and the matched signs of use in the relatively larger and relatively smaller field of view images, computing hypothetical positions of signs of use in the relatively smaller field of view image using the estimated pose and the projection of signs of use onto the 3D model, comparing the hypothetical positions with actual positions of the signs of use in the relatively smaller field of view image to identify improperly projected of the signs of use, and eliminating the improperly projected of the signs of use from the projections onto the 3D model of the object.

This and other implementations can include one or more of the following features. The method can include projecting the improperly projected of the signs of use onto the 3D model of the object based on the relative pose of the instance of the object in a relatively smaller field of view image. Projecting the improperly projected of the signs of use onto the 3D model can include identifying a region of the relatively smaller field of view image that includes a first of the improperly projected of the signs of use, matching the first of the improperly projected of the signs of use to a first of the signs of use in the relatively larger field of view image, and projecting the first of the signs of use in the relatively larger field of view image onto the 3D model of the object.

The improperly projected subset of the signs of use can be identified based on a positional deviation between the hypothetical positions and the actual positions of the signs of use in the relatively smaller field of view image. Matching the signs of use can include determining the dominant color of the instance of the object in the relatively smaller field of view image, identifying regions in the relatively larger field of view image, in the relatively smaller field of view image, or in both the relatively larger field of view image and the relatively smaller field of view image that deviate from the dominant color. Matching the signs of use can include determining a deviation from ideality in the instance of the object in the relatively smaller field of view image, and matching the deviation in the relatively smaller field of view image to the relatively larger field of view image. The method can include deforming the 3D model using properly projected of the signs of use from the projections onto the 3D model of the object.

Other embodiments of the above-described methods include corresponding systems and apparatus configured to perform the actions of the methods, and computer storage medium encoded with a computer program, the program comprising instructions that when executed by data processing apparatus cause the data processing apparatus to perform the actions of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
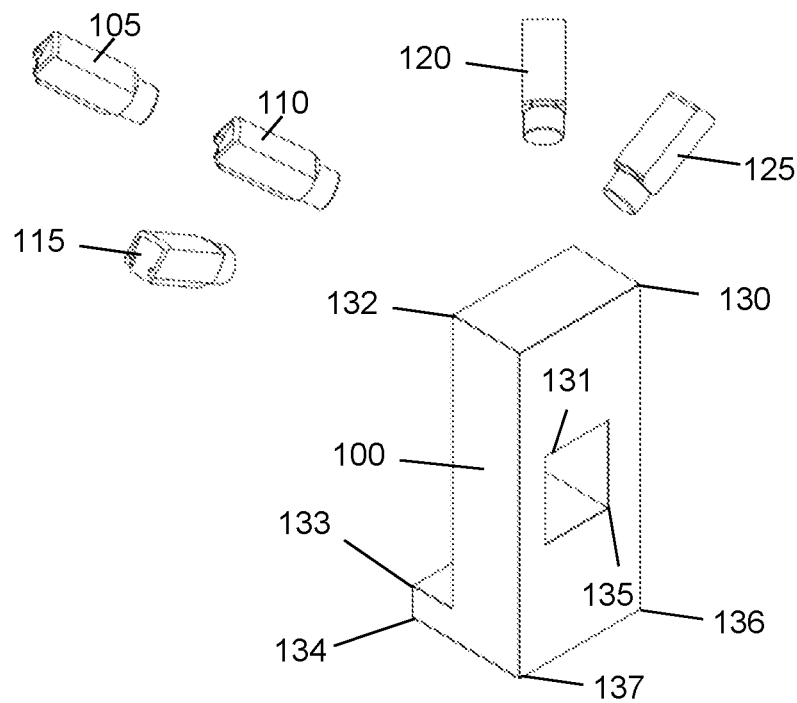
FIG. 1 is a schematic representation of the acquisition of a collection of different images of an object.

FIG. 1 is a schematic representation of the acquisition of a collection of different images of an object 100. For illustrative purposes, object 100 is shown as an assembly of ideal, unmarked geometric parts (e.g., cubes, polyhedrons, parallelepipeds, etc.). However, in real-world applications, objects will generally have a more complicated shape and be textured or otherwise marked, e.g., with ornamental decoration, wear marks, or other markings upon the underlying shape.

A collection of one or more imaging devices (here, illustrated as cameras 105, 110, 115, 120, 125) can be disposed successively or simultaneously at different relative positons around object 100 and oriented at different relative angles with respect to object 100. The positions can be distributed in 3-dimensional space around object 100. The orientations can also vary in 3-dimensions, i.e., the Euler angles (or yaw, pitch, and roll) can all vary. The relative positioning and orientation of a camera 105, 110, 115, 120, 125 with respect to object 100 can be referred to as the relative pose. Since cameras 105, 110, 115, 120, 125 have different relative poses, cameras 105, 110, 115, 120, 125 will each acquire different images of object 100.

Even a simplified object like object 100 includes a number of landmarks 130, 131, 132, 133, 134, 135, 136, . . . A landmark is a position of interest on object 100. Landmarks can be positioned at geometric locations on an object or at a marking upon the underlying geometric shape. As discussed further below, landmarks can be used for determining the pose of the object. Landmarks can also be used for other types of image processing, e.g., for classifying the object, for extracting features of the object, for locating other structures on the object (geometric structures or markings), for assessing damage to the object, and/or for serving as point of origin from which measurements can be made in these and other image processing techniques.

Figure 2:
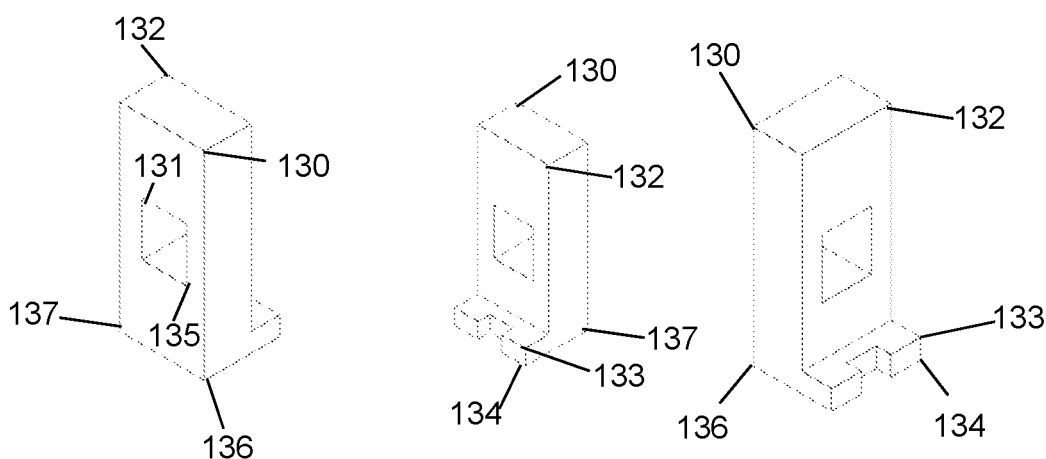
FIG. 2 is a schematic representation of a collection of two-dimensional images acquired by one or more cameras.

FIG. 2 is a schematic representation of a collection 200 of two-dimensional images acquired by one or more cameras, such as cameras 105, 110, 115, 120, 125 (FIG. 1). The images in collection 200 show object 100 at different relative poses. Landmarks like landmarks 130, 131, 132, 133, 134, 135, 136, . . . appear at different locations in different images-if they appear at all. For example, in the leftmost image in collection 200, landmarks 133, 134 are obscured by the remainder of object 100. In contrast, in the rightmost image 210, landmarks 131, 135, 137 are obscured by the remainder of object 100.

As discussed above, 3D models are often idealized abstractions of real-world instances of an object and do not, e.g., include signs of use that are present in those real-world instances. It would however be beneficial to include those signs of use in a 3D model in a variety of contexts. For example, when a 3D model is used to simulate the mechanical or other behavior of a real-world instance of an object, the signs of use can impact the outcome of the simulation. As another example, a 3D model that includes signs of use can be used to estimate remedial actions that reduce or remedy the use. For example, a 3D model of a car that includes damage from an accident can be used to accurately assess, e.g., the safety of the car or the cost of repair. As yet another example, a 3D model that includes signs of use can be used to estimate the time to failure or failure mechanism of an instance of the object. In these and other contexts, annotating 3D models with signs of use from 2D images can provide a relatively facile way to allow the 3D models to include signs of use and more accurately model real-world instances.

Figure 3:
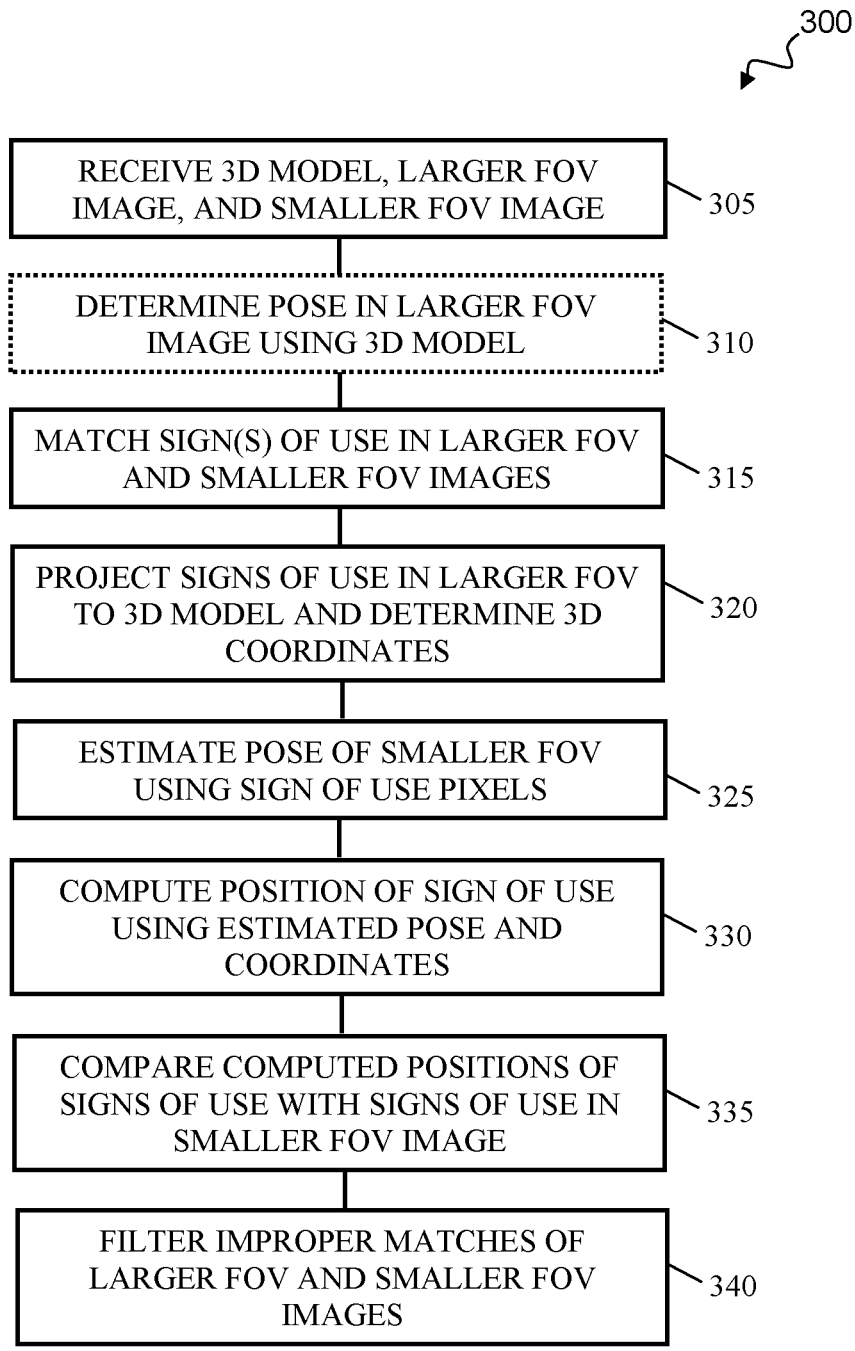
FIG. 3 is a flowchart of a computer-implemented process for annotating 3D models with signs of use from 2D images.

FIG. 3 is a flowchart of a computer-implemented process 300 for annotating 3D models with signs of use from 2D images. Process 300 can be performed by one or more data processing devices that perform data processing activities. The activities of process 300 can be performed in accordance with the logic of a set of machine-readable instructions, a hardware assembly, or a combination of these and/or other instructions.

At 305, the device performing process 300 receives i) a 3D model of a physical object, ii) at least one image of an instance of the object with a relatively larger field of view (FOV), and iii) at least one image of the same instance of the object with a relatively smaller FOV. 3D models generally represent an object in three-dimensional space, generally divorced from any frame of reference. 3D models can be created manually, algorithmically (procedural modeling), or by scanning real objects. For example, 3D models can be generated using computer-aided design (CAD) software. Surfaces in a 3D model may be defined with texture mapping.

Each relatively smaller FOV of the instance of the object includes relevant sign(s) of use that are to be annotated onto the 3D model of the object. In general, the smaller FOV images will show the instance in sufficient detail that—after the pose of the smaller FOV is determined—a 3D model can be effectively annotated with the signs of use in the smaller FOV image. The relatively smaller FOV image can thus "zoom in" on the relevant signs of use and provide detail about the signs that could be hard to discern in images with a larger field of view.

Each relatively larger FOV image of the instance shows both the relevant signs of use and another portion of the instance. In some instances, the larger FOV image is a full view of the instance, i.e., the entire instance is visible in the larger FOV image. In general, the other portion of the instance will at least include sufficient features that allow the relative pose of the instance in the larger FOV image to be accurately determined. As for the signs of use, at least some of the signs that are visible within the smaller FOV image will also be visible in the larger FOV image and not obscured. Although the same signs of use are visible in both the relatively smaller and larger FOV images, the resolution of the signs of use in the relatively larger FOV image need not be high enough to annotate the 3D model based on the larger FOV image alone. Indeed, since the relatively larger FOV image necessarily includes a larger portion of the object, the signs of use are generally shown at a resolution that is too low for effective annotation of a 3D model.

As for determining the relative pose of the instance in the larger FOV image — and hence the correspondence of the features in the larger FOV and the features of the 3D model — this can be done in a number of ways. The extent of the portion of the object that is shown in the relatively larger FOV image can impact the approach by which the relative pose and positional correspondence is determined.

For example, in some implementations, a machine learning model may be used to detect the outline of the instance of the object in the larger FOV image. In such cases, it is generally preferred that the relatively less detailed image be a full view of the instance for the given pose.

As another example, a pose estimation machine learning model may be used to estimate the pose of the instance in the relatively larger FOV image. In such cases, it may be acceptable if the relatively larger FOV image includes a sufficient number and arrangement of landmarks so that pose estimation can occur. The pose of the object can be estimated based on the landmarks that are detected, the distance that separates them, and their relative positions in the larger FOV image. An example machine learning model for landmark detection is the detectron2available at https://github.com/facebookresearch/detectron2. An example of a pose estimator that relies upon landmark detection is OpenCV's functionality SolvePNP described at https://docs.opencv.org/master/d7/d53/tutorial_py_pose.html.

As yet another example, in some implementations, the pose of the instance in the relatively larger FOV image can be determined as described in Greek patent application serial No. 20210100068, entitled "ANNOTATION OF TWO-DIMENSIONAL IMAGES" and filed on 2 Feb. 2021, the contents of which are incorporated herein by reference.

As yet another example, in some implementations, the pose of the instance in the relatively larger FOV image can be received from an outside source along with the relatively larger FOV image. For example, the relatively larger FOV image can be associated with metadata that specifies the relative positioning and orientation of a camera with respect to the instance when the relatively larger FOV image was acquired.

At 310, if necessary, the device performing process 300 determines the pose of the instance of the object in the relatively larger FOV image. Examples approaches for determining the pose are discussed above. Also as discussed above, in some instances a determination may not be necessary and the pose can be received from an outside source.

At 315, the device performing process 300 matches the signs of use in the relatively larger FOV images to the signs of use in the relatively smaller FOV image. In general, the signs of use in the two images can be matched pixel-by-pixel. For example, a feature detection algorithm (e.g., scale-invariant feature transform) can identify pixels of interest in either of the images, extract portions of the image around the pixels, and seek matching pixels in the other of the images. In some implementations, image registration techniques can also be used — either alone or in conjunction with feature detection algorithms.

In general, the criteria for detecting features or registering images will be tailored to the context in which method 300 is performed. For example, color deviations may be emphasized when identifying damage that arises from a discrete incident, whereas deviations from idealized geometries (e.g., a surface that is uniformly smooth or a gear with uniform teeth) may be emphasized when identifying wear-and-tear. By way of example, suppose that scratches and dents on a car are to be annotated onto a 3D model. The dominant color of the relatively smaller FOV image can be taken to be the color of the car. Pixels can be filtered from the larger FOV image, the smaller FOV image, or both according to how close the pixel color is to this dominant color. Pixels with large color deviations can be designated as pixels of interest in either a feature detection algorithm or image registration technique.

In some implementations, the content of the relatively larger FOV image can be reduced prior to matching. For example, the shape of the instance of the object in the relatively larger FOV image can be estimated. Pixels that are outside the bounds of the object can be excluded from including matches. Since pixels that represent, e.g., objects in the background are excluded, the computational burden and likelihood of an incorrect match are reduced.

Figure 4:
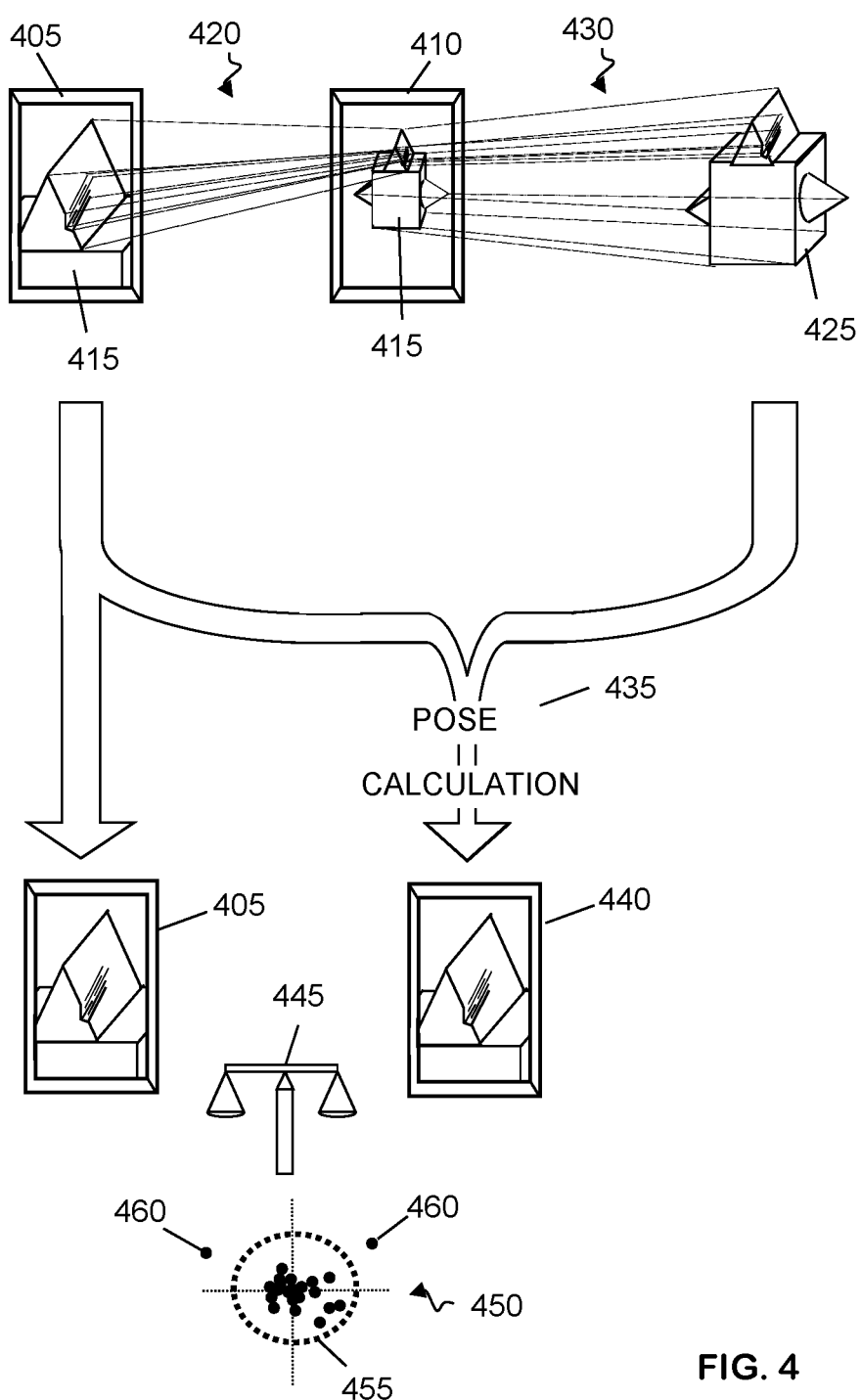
FIG. 4 includes a schematic representation of a computer-implemented process for annotating 3D models with signs of use from 2D images.

FIG. 4 is a schematic representation of a computer-implemented process for annotating 3D models with signs of use from 2D images. In the schematic representation, signs of use in a relatively smaller FOV image 405 are matched to the signs of use in a relatively larger FOV image 410. In particular, both images 405, 410 show an instance 415 of object, albeit with different extents and, in most cases, with different levels of detail. Image 410 is a full view of instance 415, whereas image 405 is a smaller FOV image of signs of use on instance 415. Although both images 405, 410 include the signs of use, images 405, 410 need not taken from the same angle. For example, in the illustrated example, the camera that acquired image 410 was slightly more to the right of instance 415 than the camera that acquired image 415.

Various features in images 405, 410 — including signs of use and other features such as corners and edges — have been matched. The matches are schematically illustrated as a collection 420 of dashed lines. However, because relatively smaller FOV image 405 only shows a relatively smaller portion of the instance, the number of features that are not signs of use and available to be matched is relatively small. Indeed, in many implementations, only signs of use are matched.

Returning to FIG. 3, at 320, the device performing process 300 projects the signs of use from the larger FOV image onto the 3D model of the object and determines 3D coordinates of the signs of use on the 3D model. The projection relies upon the pose of the instance of the object in the relatively larger FOV image — either as determined at 310 or as received from an outside source. The projection can rely upon features in the larger FOV image that are not found in the smaller FOV image, e.g., features that are outside the field of view in the smaller FOV image. Further, since the projection relies upon such features, the projection from the larger FOV image onto the 3D model is relatively accurate. As a result, the coordinates of the signs of use can be accurately determined on the 3D model by reference to the position of these other features.

FIG. 4 also includes a schematic representation of projection of the signs of use from the larger FOV image 410 onto a 3D model 425. The projection is schematically illustrated as a collection 430 of dashed lines. As shown, the projection can rely upon features in relatively larger FOV image 410 that are not present in the relatively smaller FOV image 405, including edges and corners that are outside the field of view in image 405. Since the projection relies upon a relatively larger portion of the instance of the objection, the projection is relatively accurate. Using the position of these features as a reference, the coordinates of the signs of use can also be accurately determined on the 3D model.

Returning to FIG. 3, at 325, the device performing process 300 estimates the pose of the instance of the object in the smaller FOV image using the coordinates of the signs of use on the 3D model. In particular, the matches between signs of use in the smaller and larger FOV images and the projection of the signs of use from the larger FOV image to the model allows the pose of the instance of the object in the smaller FOV image to be estimated. Since — compared to the larger FOV image — the smaller FOV image generally includes more detail about the signs of use but less detail about other features, using the signs of use to estimate the pose in the smaller FOV image exploits the features that are present in that image.

At 330, the device performing 300 calculates hypothetical positions of the signs of use in the smaller FOV image using the estimated pose of the smaller FOV image and the coordinates of the signs of use on the 3D model. This calculation can be thought of as a hypothetical recreation of the smaller FOV image using the estimated pose and the coordinates of the signs of use on the 3D model as the ground truth. In most cases, the entire smaller FOV image is not recreated. Rather, in effect, the calculation determines where the signs of use in the smaller FOV image would be found under the assumption that the estimated pose and the coordinates of the signs of use on the 3D model are correct.

At 335, the hypothetical positions of the signs of use are compared with the actual positions of the signs of use in the smaller FOV image. Individual features with a poor correspondence between the hypothetical position and actual position can be identified. Since the pose is calculated based on a number of features, the poor correspondence indicates that individual signs of use are improperly projected onto the 3D model. At 340, such features can be filtered from the matches established at 315.

For example, a threshold for identifying a poor correspondence can be established based on, e.g., an average correspondence of all features, of selected features, or both. For example, in some implementations, an average correspondence of all features can be determined. Features that deviate substantially from this average correspondence of all features can be identified and eliminated from the matches established at 315.

As another example, features can be classified according to their distinctiveness. The threshold for identifying poor correspondence can then be established based on the most distinctive features. For example, in some implementations, the criteria used for detecting features or registering images at 315 can be used to identify features that are more distinctive than other features. Examples include the number of pixels in an area where color deviations are present or the number of pixels encompassed by a deviation from an idealized geometry. The correspondence of the more distinctive features can be used to establish a threshold for identifying features with a poor correspondence. Features that exceed this threshold can be identified and eliminated from the matches established at 315.

As yet another example, an average correspondence of all features can be determined in a "first pass" through the feature. Features that deviate substantially from this average correspondence of all features can be eliminated from a recalculation of the correspondence of the hypothetical and actual positions. Other features that deviate substantially from this recalculated correspondence of a subset of the features can then be identified and eliminated from the matches established at 315.

Returning to FIG. 4, the pose 435 of the instance of the object in the smaller FOV image 405 is estimated using the coordinates of the signs of use on the 3D model 425. This pose can be used to calculate hypothetical positions of the signs of use in the smaller FOV image. For illustrative purposes, this calculation is schematically represented as a hypothetical recreation 440 of the smaller FOV image, although only the positions of the signs of use in the smaller FOV image need be calculated. A comparison 445 between the actual positions of the signs of use in the smaller FOV image and the calculated, hypothetical positions of the signs of use is performed and the correspondence therebetween determined. The correspondence is schematically illustrated as a collection 450 of positional deviations, i.e., the difference between the actual two-dimensional position of each feature of the signs of use in the less detailed image 405 and the hypothetical position of the same feature calculated from the relative pose of the smaller FOV image 405 and the projection of the signs of use onto 3D model 425. A threshold 455 for identification and filtering of poor matches is also schematically illustrated. As shown, at least some positional deviations 460 are outside threshold 455. The matches between the positions of features of the signs of use in the smaller FOV image 405 and larger FOV image 410 that correspond to positional deviations 460 can be identified and eliminated from collection 420.

Returning to FIG. 3, after any improper matches have been eliminated from the matches established at 315, the remaining matches can be used in a variety of different ways.

For example, in some instances, few matches will be eliminated at 340 and/or a sufficient number of matches will have a sufficiently high correspondence. The projection of the matches with a high correspondence onto the 3D model can be used for a variety of downstream purposes including, e.g., estimating remedial actions that reduce or cure the use, accurately assessing safety of the instance, or estimating the time to failure of the instance. In such cases, the illustrated portion of process 300 would effectively come to an end—although further downstream actions are contemplated.

In many instances, relatively large numbers of matches will be eliminated and/or an insufficient number of matches will have a sufficiently high correspondence for the contemplated downstream purposes. In such case, portions of process 300 can be repeated iteratively until few matches are eliminated and/or a sufficient number of matches has a sufficiently high correspondence.

For example, in some implementations, all or portion of process 300 can be repeated to seek matches in regions in the smaller FOV image from which matches were eliminated. These regions can be treated as a still smaller FOV image of the instance of the object in the next iteration of process 300. Either the larger FOV image (e.g., image 410 in FIG. 4) from the previous iteration or the same smaller FOV image (e.g., image 405 in FIG. 4) can be used as the larger FOV image in this next iteration. In effect, process 300 can be performed multiple times, with each smaller FOV image having a progressively smaller field of view and relying upon the pose estimation provided by previous iterations. The assignment of signs of use to the 3D model becomes progressively more accurate as smaller and smaller fields of view are used. In some cases, the performance of process 300 can be stopped when, e.g., the percentage or number of matches does not increase or only increases below a threshold amount.

As another example, the pose estimated at 325 can be used to match the signs of use in the larger and smaller FOV images more accurately. For example, the pose estimated at 325 can be used to identify and discard unrealistic or improper matches at 315 in the next iteration of process 300. As a result, the accuracy of the matches in this next iteration will increase, as will the accuracy of the projection of the signs of use onto the 3D model at 320 and the accuracy of the pose estimation at 325. In some implementations, the threshold for identifying poor correspondence between the hypothetical position and actual position can be made more stringent and process 300 repeated. In some cases, the performance of process 300 can be stopped when, e.g., the threshold for identifying poor correspondence does not becomes more stringent or only becomes more stringent by a threshold amount.

As yet another example, process 300 can be repeated both:
to increase the accuracy of the pose estimation at 325 by identifying and discarding unrealistic or improper matches at 315, and
to increase the percentage or number of matches by performing process with successive relatively smaller FOV images, i.e., each having a smaller field of view. For example, the accuracy of the pose estimation at 325 can be iteratively increased. Then, the higher accuracy pose estimation can be used to identify matches in successive images each having a smaller field of view but the same pose.

In some cases, the structured information regarding the signs of use can be used, e.g., to deform or otherwise modify a 3D model of an object so that it comports with a particular instance the object. The modified 3D model can be used in a variety of simulation and assessment processes.

In order to modify the 3D model, a variety of different approaches can be used to determine the three dimensional positions that correspond to the two dimensional positions in the smaller FOV image.

For example, in some implementations, process 300 can be performed multiple times using multiple images with diverse poses. For example, each performance of process 300 could use a different smaller FOV image with the same or different larger FOV image(s). The smaller FOV images can include the same signs of use in their respective field of view, albeit taken from different poses. A comparison of the positions of the signs of use determined in the different performances of process 300 can be used to determine the parallax errors inherent in those positions. If the different poses of the images are sufficiently diverse, the three-dimensional structure of the signs of use can be determined and used to deform or otherwise modify the 3D model.

As another example, 3-dimensional depth data can be acquired from model instances of the object and used, along with image information, to train a machine-learning model to estimate the three-dimensional structure that accompanies the signs of use. The 3-dimensional depth data can be acquired using any of a variety of different coordinate measuring machines, including, e.g., mechanical metrology probes, laser scanners, LIDAR sensors, or the like. In general, the machine-learning model will be trained using multiple images from diverse poses and can use the positions determined from multiple performances of process 300 to estimate 3-dimensional depth data.

As another example, in some implementations, the signs of use may arise from a well-constrained process. Examples include, e.g., repetitive wear of a gear or repetitive loading of a shaft. The constraints of the process can be used to determine the three dimensional structure that correspond to the positions determined in process 300.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising
projecting signs of use in a relatively larger field of view image of an instance of an object onto a 3D model of the object based on a pose of the instance in the relatively larger field of view image; and
estimating a relative pose of the instance of the object in a relatively smaller field of view image based on matches between the signs of use in the relatively larger field of view image and the same signs of use in the relatively smaller field of view image.

2. The method of claim 1, further comprising:
computing hypothetical positions of signs of use in the relatively smaller field of view image using the estimated pose and the projection of signs of use onto the 3Dmodel;
comparing the hypothetical positions with actual positions of the signs of use in the relatively smaller field of view image; and
identifying, based on the comparison, a subset of the signs of use that are improperly projected onto the 3D model.

3. The method of claim 2, further comprising:
deforming the 3D model using a second subset of the signs of use that are properly projected onto the 3D model.

4. The method of claim 2, further comprising:
projecting an improperly projected of the signs of use onto the 3D model of the object based on the relative pose of the instance of the object in a relatively smaller field of view image.

5. The method of claim 4, wherein projecting the improperly projected of the signs of use onto the 3D model comprises:
identifying a region of the relatively smaller field of view image that includes a first of the improperly projected of the signs of use;
matching the first of the improperly projected of the signs of use to a first of the signs of use in the relatively larger field of view image; and
projecting the first of the signs of use in the relatively larger field of view image onto the 3D model of the object.

6. The method of claim 2, wherein the improperly projected subset of the signs of use are identified based on a positional deviation between the hypothetical positions and the actual positions of the signs of use in the relatively smaller field of view image.

7. The method of claim 2, wherein the method comprises:
filtering the subset of the signs of use that are improperly projected onto the 3D model from the matches to establish a proper subset of the matches; and
again estimating the relative pose of the instance of the object in the relatively smaller field of view image based on subset of the matches.

8. The method of claim 1, wherein projecting the signs of use in the relatively larger field of view image onto the 3D model comprises determining a pose of the relatively larger field of view image.

9. The method of claim 1, further comprising:
determining a dominant color of the instance of the object in the relatively smaller field of view image;
identifying regions in the relatively larger field of view image, in the relatively smaller field of view image, or in both the relatively larger field of view image and the relatively smaller field of view image that deviate from the dominant color; and
matching the identified regions to match the signs of use in the relatively larger field of view image and the signs of use in the relatively smaller field of view image.

10. The method of claim 1, further comprising:
determining a deviation from ideality in the instance of the object in the relatively smaller field of view image; and
matching the deviation in the relatively smaller field of view image to the relatively larger field of view image to match the signs of use in the relatively larger field of view image and the signs of use in the relatively smaller field of view image.

11. The method of claim 1, comprising:
estimating relative poses of the instance of the object in a plurality of relatively smaller field of view images; and
computing hypothetical positions of the same signs of use in the relatively smaller field of view images using the estimated poses.

12. A method performed by data processing apparatus, the method comprising annotating a 3D model of an object with signs of use from two or more 2D images of an instance of the object, wherein annotating the 3D model comprises:
receiving the 3D model and the 2D images, wherein a first of the 2D images is a relatively larger field of view image of the instance and a second of the 2D images is a relatively smaller field of view image of the instance;
matching signs of use that are visible in the relatively larger field of view and relatively smaller field of view images;
projecting the signs of use in the relatively larger field of view image onto the 3D model of the object;
estimating a pose of the instance in the relatively smaller field of view image using the projection of signs of use onto the 3D model and the matched signs of use in the relatively larger and relatively smaller field of view images;
computing hypothetical positions of signs of use in the relatively smaller field of view image using the estimated pose and the projection of signs of use onto the 3D model;
comparing the hypothetical positions with actual positions of the signs of use in the relatively smaller field of view image to identify improperly projected of the signs of use; and
eliminating the improperly projected of the signs of use from the projections onto the 3D model of the object.

13. The method of claim 12, further comprising:
projecting the improperly projected of the signs of use onto the 3D model of the object based on the relative pose of the instance of the object in a relatively smaller field of view image.

14. The method of claim 13, wherein projecting the improperly projected of the signs of use onto the 3D model comprises:
- identifying a region of the relatively smaller field of view image that includes a first of the improperly projected of the signs of use;
- matching the first of the improperly projected of the signs of use to a first of the signs of use in the relatively larger field of view image; and
- projecting the first of the signs of use in the relatively larger field of view image onto the 3D model of the object.

15. The method of claim 12, wherein the improperly projected subset of the signs of use are identified based on a positional deviation between the hypothetical positions and the actual positions of the signs of use in the relatively smaller field of view image.

16. The method of claim 12, wherein matching the signs of use comprises:
- determining the dominant color of the instance of the object in the relatively smaller field of view image;
- identifying regions in the relatively larger field of view image, in the relatively smaller field of view image, or in both the relatively larger field of view image and the relatively smaller field of view image that deviate from the dominant color.

17. The method of claim 12, wherein matching the signs of use comprises:
- determining a deviation from ideality in the instance of the object in the relatively smaller field of view image; and
- matching the deviation in the relatively smaller field of view image to the relatively larger field of view image.

18. The method of claim 12, further comprising:
- deforming the 3D model using properly projected of the signs of use from the projections onto the 3D model of the object.

19. At least one computer-readable storage medium encoded with executable instructions that, when executed by at least one processor, cause the at least one processor to perform operations for annotating a 3D model of an object with signs of use from two or more 2D images of an instance of the object, wherein annotating the 3D model comprises:
- receiving the 3D model and the 2D images, wherein a first of the 2D images is a relatively larger field of view image of the instance and a second of the 2D images is a relatively smaller field of view image of the instance;
- matching signs of use that are visible in the relatively larger field of view and relatively smaller field of view images;
- projecting the signs of use in the relatively larger field of view image onto the 3D model of the object;
- estimating a pose of the instance in the relatively smaller field of view image using the projection of signs of use onto the 3D model and the matched signs of use in the relatively larger and relatively smaller field of view images;
- computing hypothetical positions of signs of use in the relatively smaller field of view image using the estimated pose and the projection of signs of use onto the 3D model;
- comparing the hypothetical positions with actual positions of the signs of use in the relatively smaller field of view image to identify improperly projected of the signs of use; and
- eliminating the improperly projected of the signs of use from the projections onto the 3D model of the object.

* * * * *